(12) United States Patent
Hsieh

(10) Patent No.: US 7,441,994 B2
(45) Date of Patent: Oct. 28, 2008

(54) MACHINE TOOL HAVING A C-SHAPED FRAME

(76) Inventor: Shu-Yen Hsieh, No. 23, chang-An Rd., Taichung Hsien, Tai-Ping City (TW)

( * ) Notice: Subject to any disclaimer, the term of this patent is extended or adjusted under 35 U.S.C. 154(b) by 29 days.

(21) Appl. No.: 11/732,100

(22) Filed: Apr. 2, 2007

(65) Prior Publication Data

US 2008/0236359 A1 Oct. 2, 2008

(51) Int. Cl.
*B23C 1/06* (2006.01)
*B23Q 1/46* (2006.01)
*B23Q 11/04* (2006.01)

(52) U.S. Cl. .................. 409/237; 409/235; 409/185; 409/189; 409/145; 409/160; 408/137; 408/235

(58) Field of Classification Search .............. 409/237, 409/235, 145, 159, 160, 164, 183, 185, 189, 409/197; 408/235, 234, 62, 66, 124, 129, 408/137, 138
See application file for complete search history.

(56) References Cited

U.S. PATENT DOCUMENTS

| | | | | |
|---|---|---|---|---|
| 2,464,415 A | * | 3/1949 | Philippe | 408/235 |
| 3,168,000 A | * | 2/1965 | Deflandre | 409/237 |
| 4,534,093 A | * | 8/1985 | Jahnke et al. | 409/235 |
| 5,984,600 A | * | 11/1999 | Gierth | 409/285 |
| 6,364,818 B1 | * | 4/2002 | Chen | 409/185 |
| 6,588,307 B2 | * | 7/2003 | Chen | 82/118 |
| 6,761,515 B2 | * | 7/2004 | Laur et al. | 409/235 |
| 2002/0028118 A1 | * | 3/2002 | Laur et al. | 409/235 |
| 2002/0088317 A1 | * | 7/2002 | Chen | 82/118 |
| 2004/0091301 A1 | * | 5/2004 | Kuo | 400/679 |
| 2004/0223824 A1 | * | 11/2004 | Kuo | 409/235 |

FOREIGN PATENT DOCUMENTS

| | | | |
|---|---|---|---|
| GB | 2271945 A | * | 5/1994 |
| JP | 08-150534 A | * | 6/1996 |
| JP | 2003-326431 A | * | 11/2003 |

OTHER PUBLICATIONS

Machine Translation of JP-08-150534.*

* cited by examiner

*Primary Examiner*—Erica E Cadugan

(57) ABSTRACT

A machine tool includes a machine frame, a worktable, and a spindle unit. The worktable is movable on the machine frame along a first horizontal direction, a second horizontal direction perpendicular to the first horizontal direction, and a vertical direction. The spindle unit is movable on the machine frame along the vertical direction.

9 Claims, 9 Drawing Sheets

MACHINE TOOL HAVING A C-SHAPED FRAME

BACKGROUND OF THE INVENTION

1. Field of the Invention

This invention relates to a machine tool, and more particularly to a machine tool having a C-shaped frame.

2. Description of the Related Art

Referring to FIGS. 1 and 2, a first conventional tool 10 includes a C-shaped frame 11 disposed on a horizontal surface 20 and including a base seat 111 and an upright mounting frame 112. A worktable 12 is movable on the base seat 111 along a first horizontal direction (X) and a second horizontal direction (Y). A spindle seat 13 is movable on the upright mounting frame 112 toward or away from the worktable 12 along a vertical direction (Z). A main spindle 15 is journalled on the spindle seat 13, and is driven by a motor 14.

A cutter 22 is mounted to the main spindle 15 for machining a workpiece 21 placed on the worktable 12.

Since the worktable 12 cannot be moved vertically, machining on a large-sized workpiece is unable to be performed due to the limited space between the worktable 12 and the spindle seat 13.

A second conventional machine tool includes a worktable movable vertically on a base seat. A spindle seat of the second conventional machine tool, however, is fixed on an upright mounting frame. This also results in a limited space between the worktable and the spindle, which cannot receive a large-sized workpiece.

SUMMARY OF THE INVENTION

The object of this invention is to provide a machine tool that includes a worktable and a spindle seat, which are movable vertically on a C-shaped machine frame.

According to this invention, a machine tool includes a machine frame, a worktable, and a spindle unit. The worktable is movable on the machine frame along a first horizontal direction, a second horizontal direction perpendicular to the first horizontal direction, and a vertical direction. The spindle unit is movable on the machine frame along the vertical direction.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
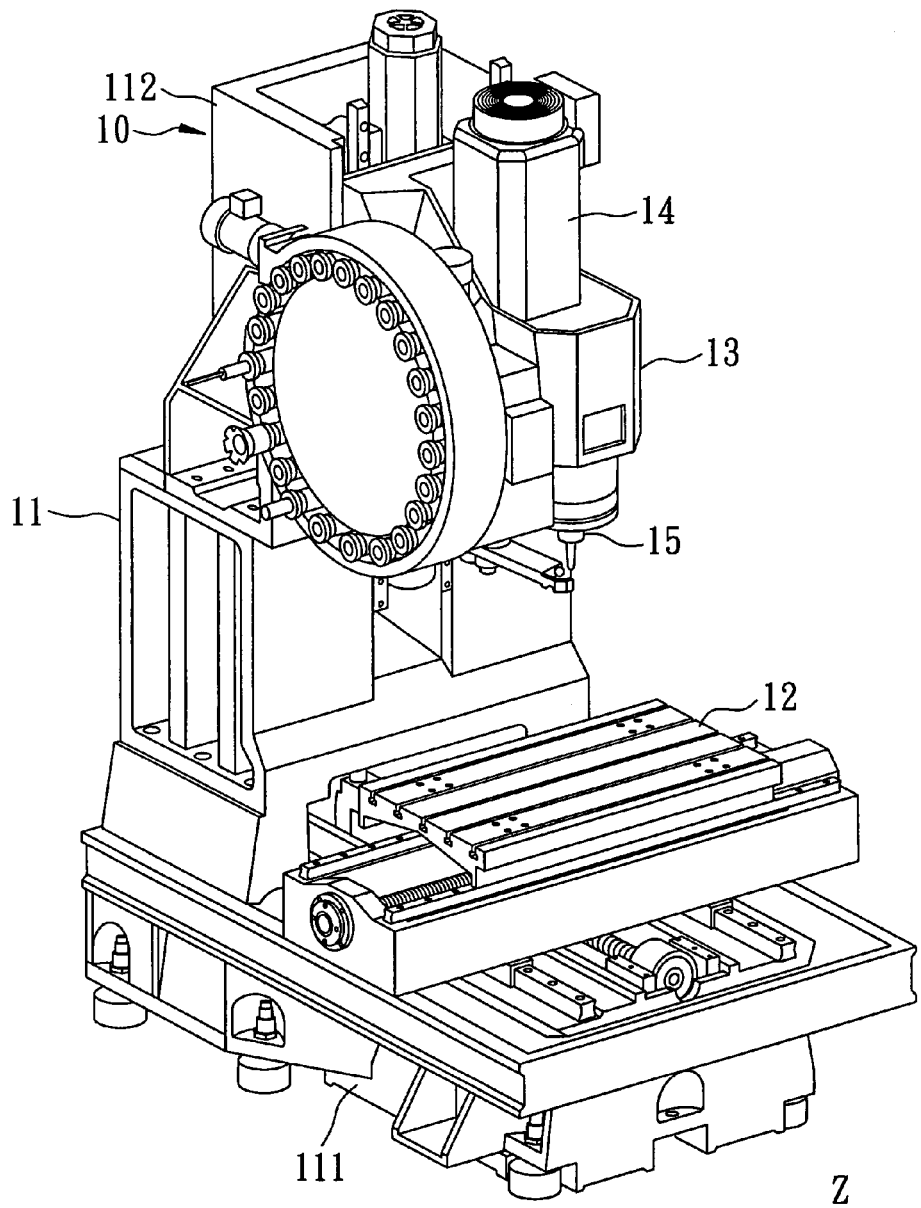
FIG. 1 is a perspective view of a conventional machine tool having a C-shaped frame.
Figure 1:
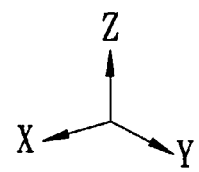
Figure 2:
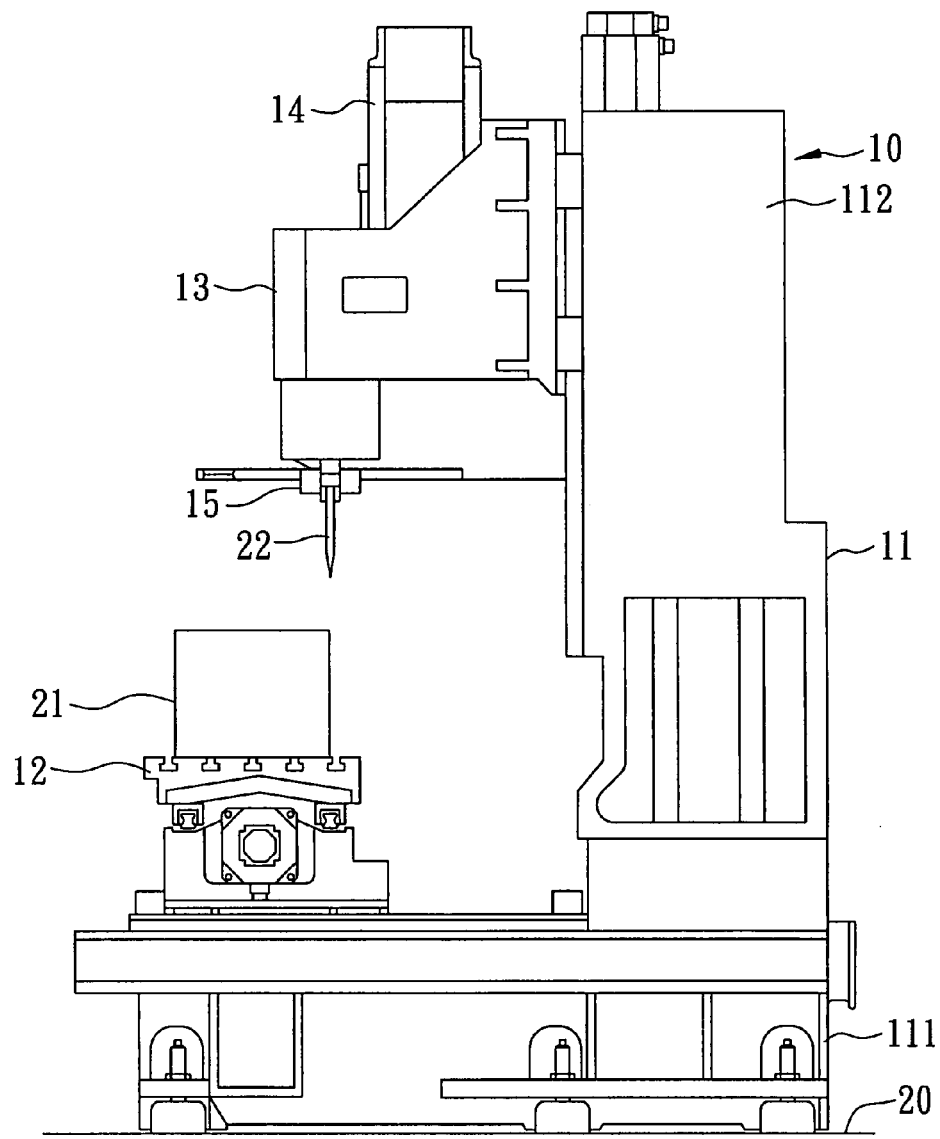
FIG. 2 is a side view of the conventional machine tool.
Figure 3:
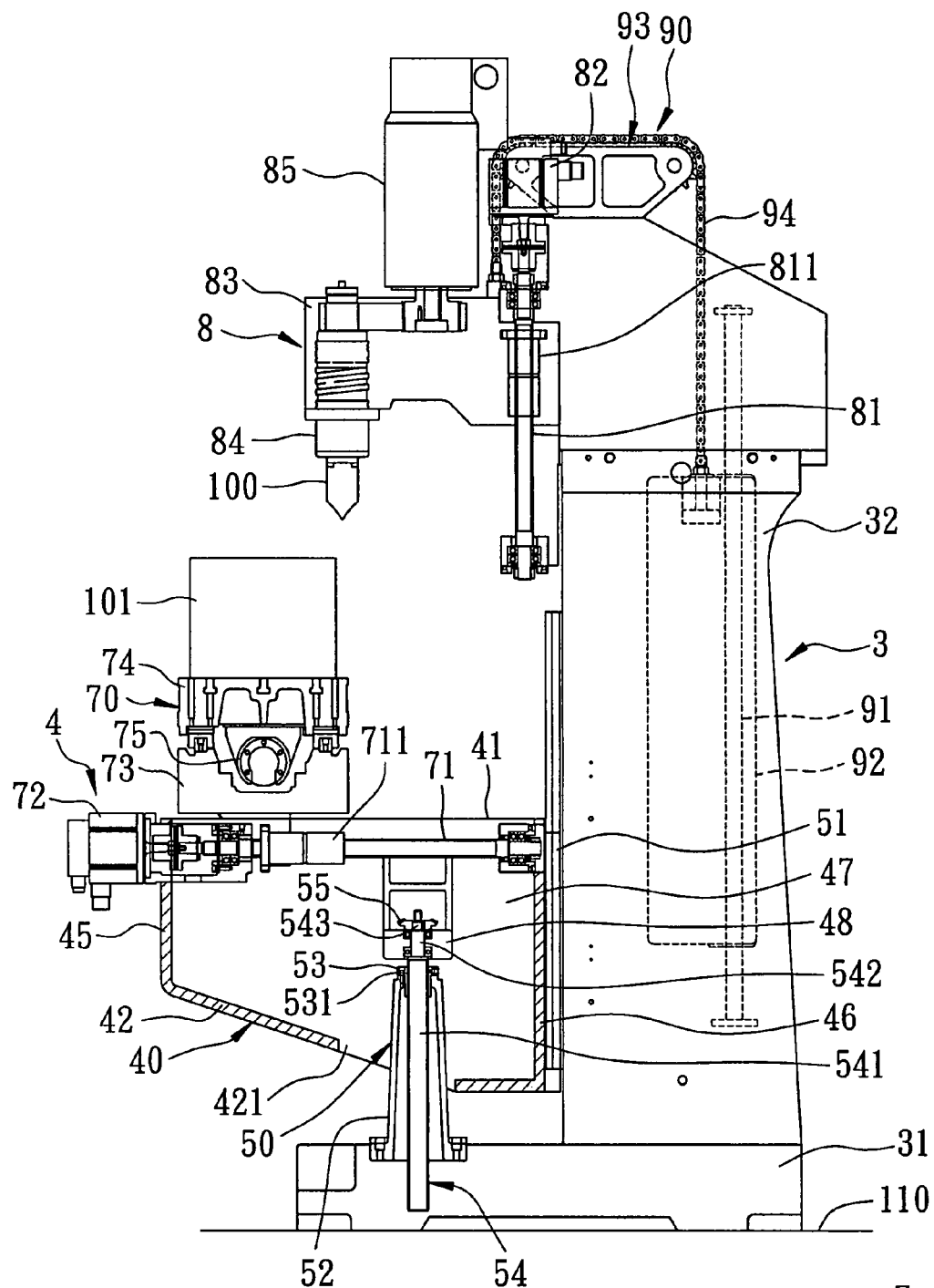
FIG. 3 is a partly sectional side view of the preferred embodiment of a machine tool according to this invention.
Figure 5:
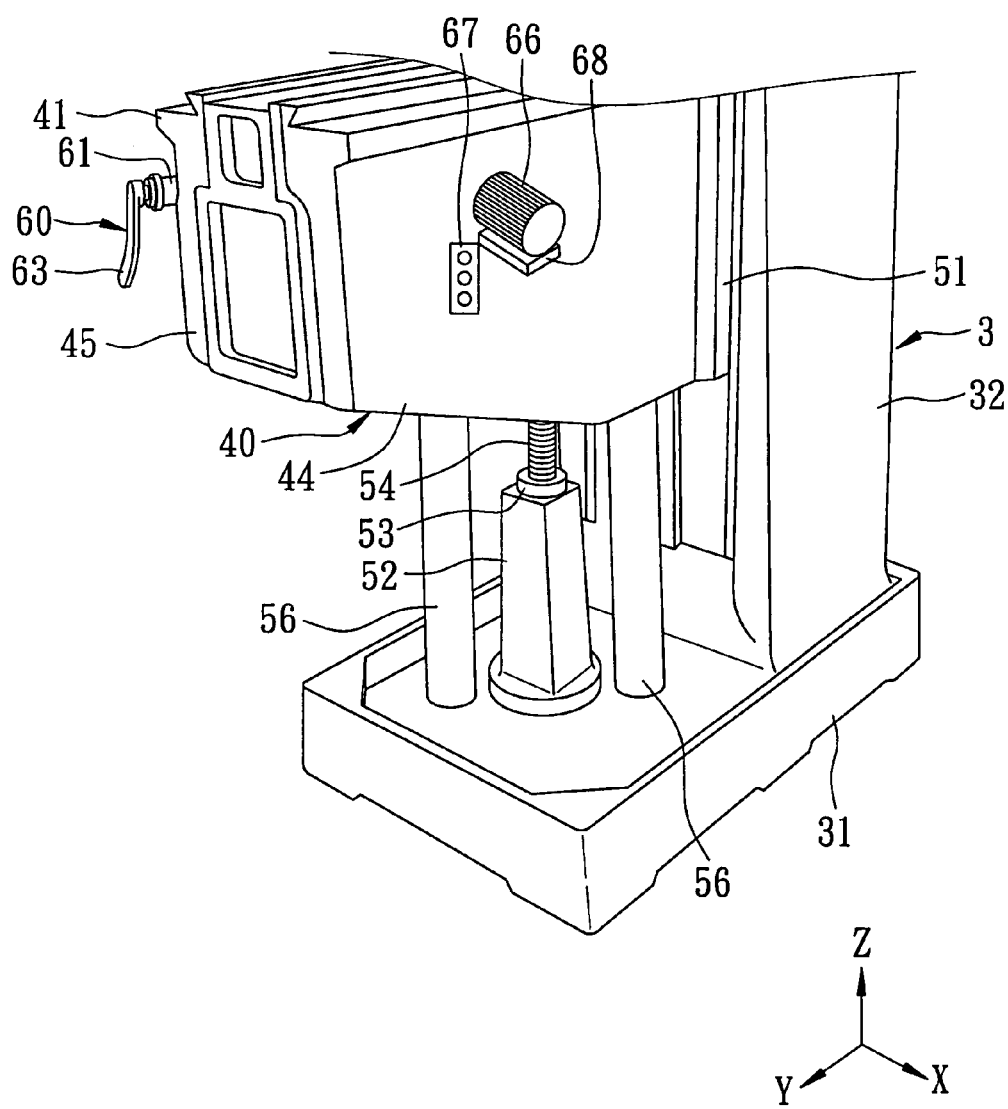
FIG. 5 is a fragmentary perspective view of the preferred embodiment, illustrating a lower driving unit and an operating unit.
Figure 6:
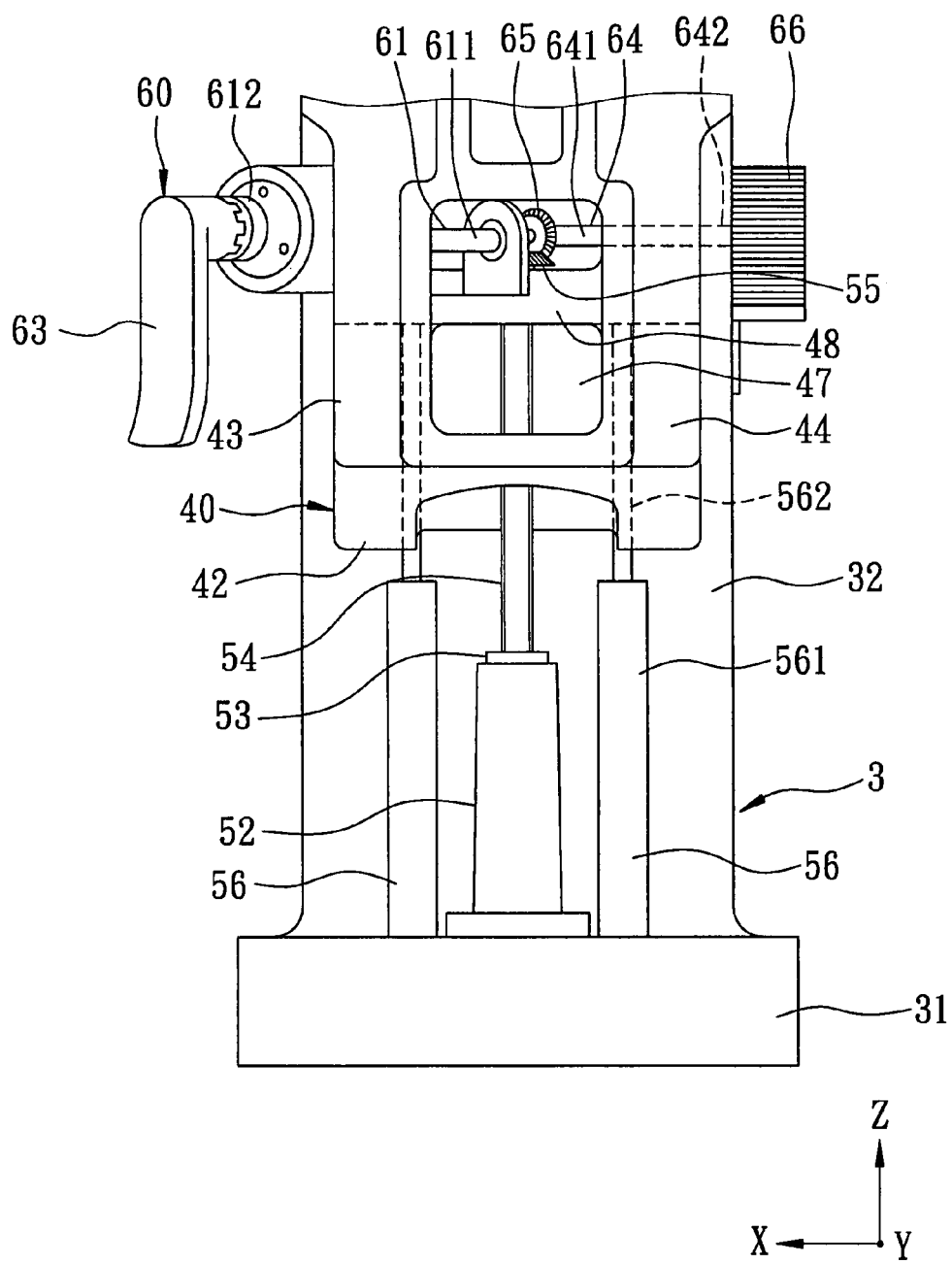
FIG. 6 is a fragmentary front view of the preferred embodiment, illustrating the lower driving unit and the operating unit.

Referring to FIGS. 3, 5, and 6, the preferred embodiment of a machine tool according to this invention includes a machine frame 3 disposed on a horizontal surface 110, as well as a worktable device 4 and a spindle apparatus 8 that are disposed on the machine frame 3.

The machine frame 3 includes a base seat 31 disposed on the horizontal surface 110, and a hollow upright mounting frame 32 disposed fixedly on the base seat 31.

The worktable device 4 includes a worktable-carrying member 40, a lower driving unit 50 disposed between the worktable-carrying member 40 and the machine frame 3, an operating unit 60 disposed on the worktable-carrying member 40 and operable to activate the lower driving unit 50, and a worktable unit 70 disposed on the worktable-carrying member 40.

The worktable-carrying member 40 includes a housing and a supporting block 48. The housing has a top wall 41, a bottom wall 42 formed with an opening 421, a pair of first and second lateral sidewalls 43, 44, a front wall 45, and a rear wall 46, and defines an accommodating chamber 47. The supporting block 48 is disposed between and connected fixedly to the first and second lateral sidewalls 43, 44.

The lower driving unit 50 includes a guiding unit 51 disposed between the rear wall 46 and the upright mounting frame 32 for guiding vertical movement of the worktable-carrying member 40 on the machine frame 3, a supporting seat 52 disposed fixedly on and extending from the base seat 31 into the opening 421 in the bottom wall 42, a threaded seat 53 disposed fixedly on the base seat 31 and formed with a threaded hole 531, a lower vertical threaded rod 54 engaging the threaded hole 531 in the lower threaded seat 53, and a driven gear 55 connected fixedly to the lower vertical threaded rod 54. The supporting block 48 is sleeved rotatably on and movable synchronously with the lower vertical threaded rod 54. The driven gear 55 is configured as a bevel gear.

The lower vertical threaded rod 54 has a large-diameter threaded lower section 541, a mediate-diameter intermediate section 542, and a small-diameter upper end section 543. The large-diameter threaded lower section 541 engages the threaded hole 531 in the threaded seat 53, and has an upper end abutting against a lower end of the supporting block 48 at an upper end thereof. The mediate-diameter intermediate section 542 extends upwardly from the upper end of the large-diameter threaded lower section 541 and through the supporting block 48. The small-diameter upper end section 543 extends from the mediate-diameter intermediate section 542, and has a diameter smaller than that of the mediate-diameter intermediate section 542. The driven gear 55 is sleeved fixedly on the small-diameter upper end section 543, and abuts against an upper end of the mediate-diameter intermediate section 542.

The lower driving unit 50 further includes two damping units 56 flanking the lower vertical threaded rod 54 and interconnecting the supporting block 48 and the base seat 31 for damping movement of the supporting block 48 on the lower vertical threaded rod 54. Each of the damping units 56 is configured as a pressure cylinder, such as a hydraulic cylinder or a pneumatic cylinder, and includes a cylinder body 561 connected fixedly to the base seat 31, and a piston rod 562 disposed movably on the cylinder body 561 and connected fixedly to the supporting block 48.

Figure 8:
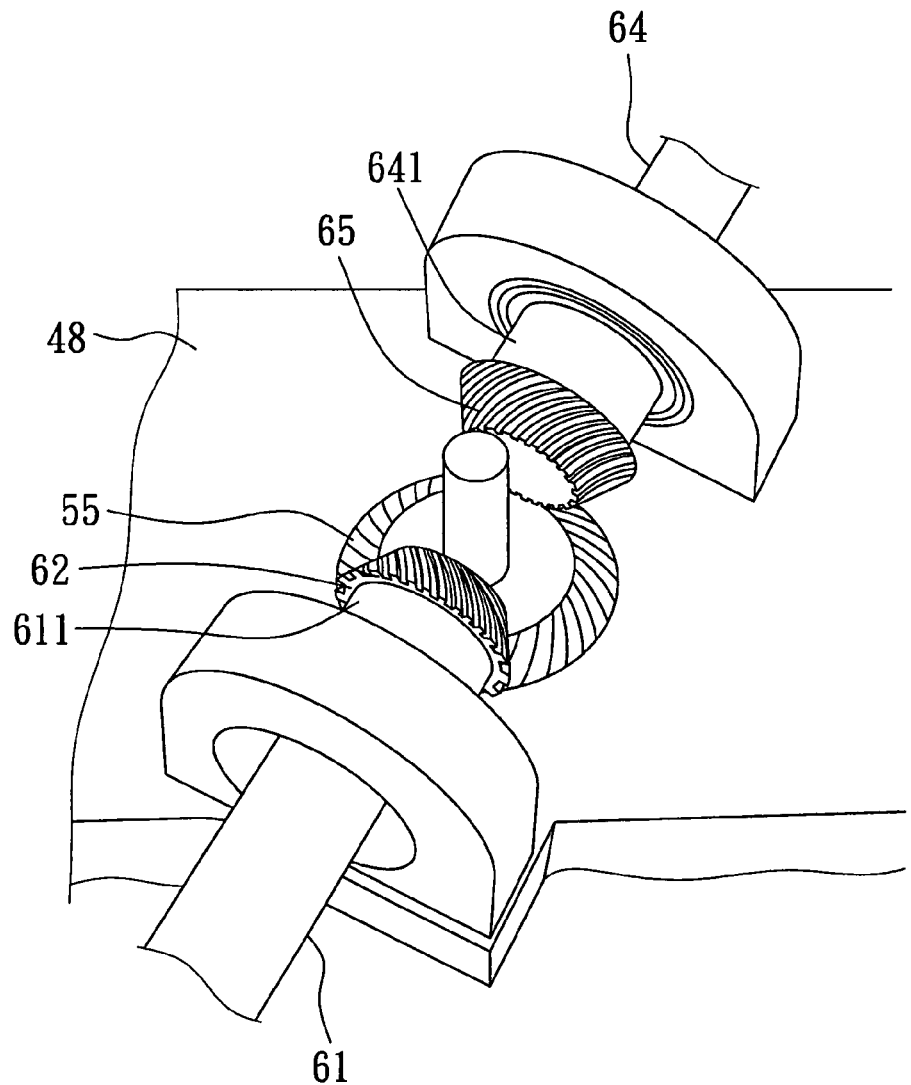
FIG. 8 is a fragmentary perspective view of the preferred embodiment, illustrating a driven gear meshing with first and second driving gears.
Figure 9:
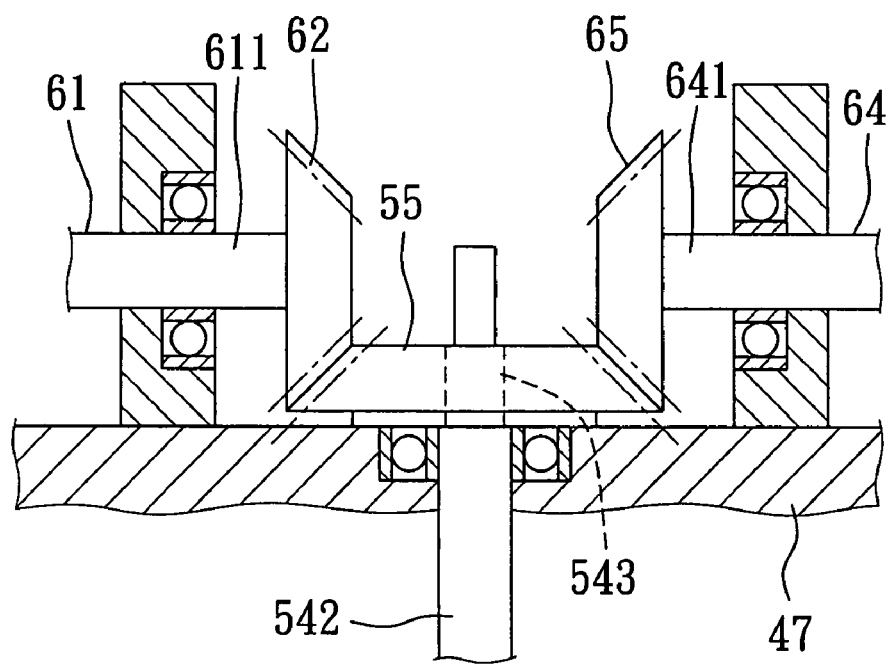
FIG. 9 is a fragmentary, partly sectional side view of the preferred embodiment, illustrating the driven gear meshing with the first and second driving gears.

With further reference to FIGS. 8 and 9, the operating unit 60 includes a first driving rod 61, a first driving gear 62, a swing lever 63, a second driving rod 64, a second driving gear 65, a first motor 66, and a control switch 67.

The first driving rod 61 is journalled on and extends through the first lateral sidewall 43, and has an inner section 611 disposed in the accommodating chamber 47, and an outer section 612 disposed outwardly of the accommodating chamber 47.

The first driving gear 62 is connected fixedly to the inner section 611 of the first driving rod 61, and meshes with the driven gear 55. The first driving gear 62 is configured as a bevel gear.

Figure 7:
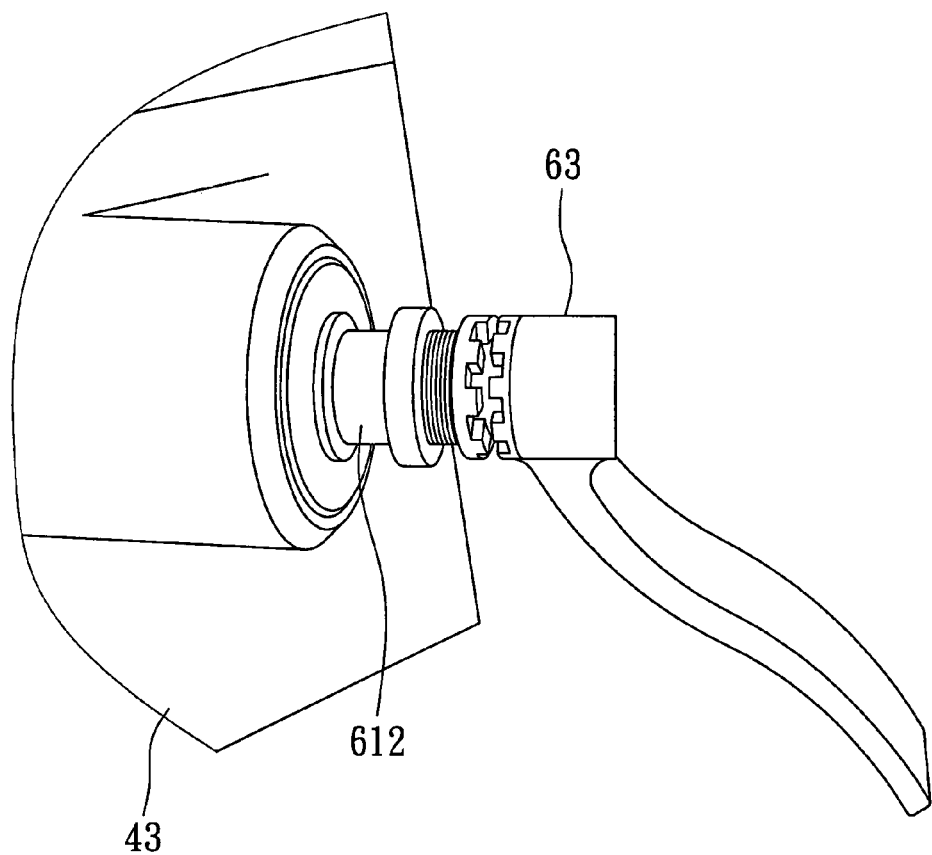
FIG. 7 is a fragmentary perspective view of the preferred embodiment, illustrating a swing lever.

The swing lever 63 is connected removably to the outer section 612 of the first driving rod 61, as shown in FIG. 7, and is operable to rotate the first driving rod 61.

The second driving rod 64 is journalled on and extends through the second lateral sidewall 44, and has an inner section 641 disposed in the accommodating chamber 47, and an outer section 642 disposed outwardly of the accommodating chamber 47.

The second driving gear 65 is connected fixedly to the inner section 641 of the second driving rod 64, and meshes with the driven gear 55. The second driving gear 65 is configured as a bevel gear.

The first motor 66 is disposed on a horizontal supporting plate 68 (see FIG. 5) attached fixedly to the second lateral sidewall 44. When the control switch 67 is switched on, the second driving rod 64 is rotated. When the control switch 67 is switched off, idle rotation of the motor 66 is allowed.

Figure 4:
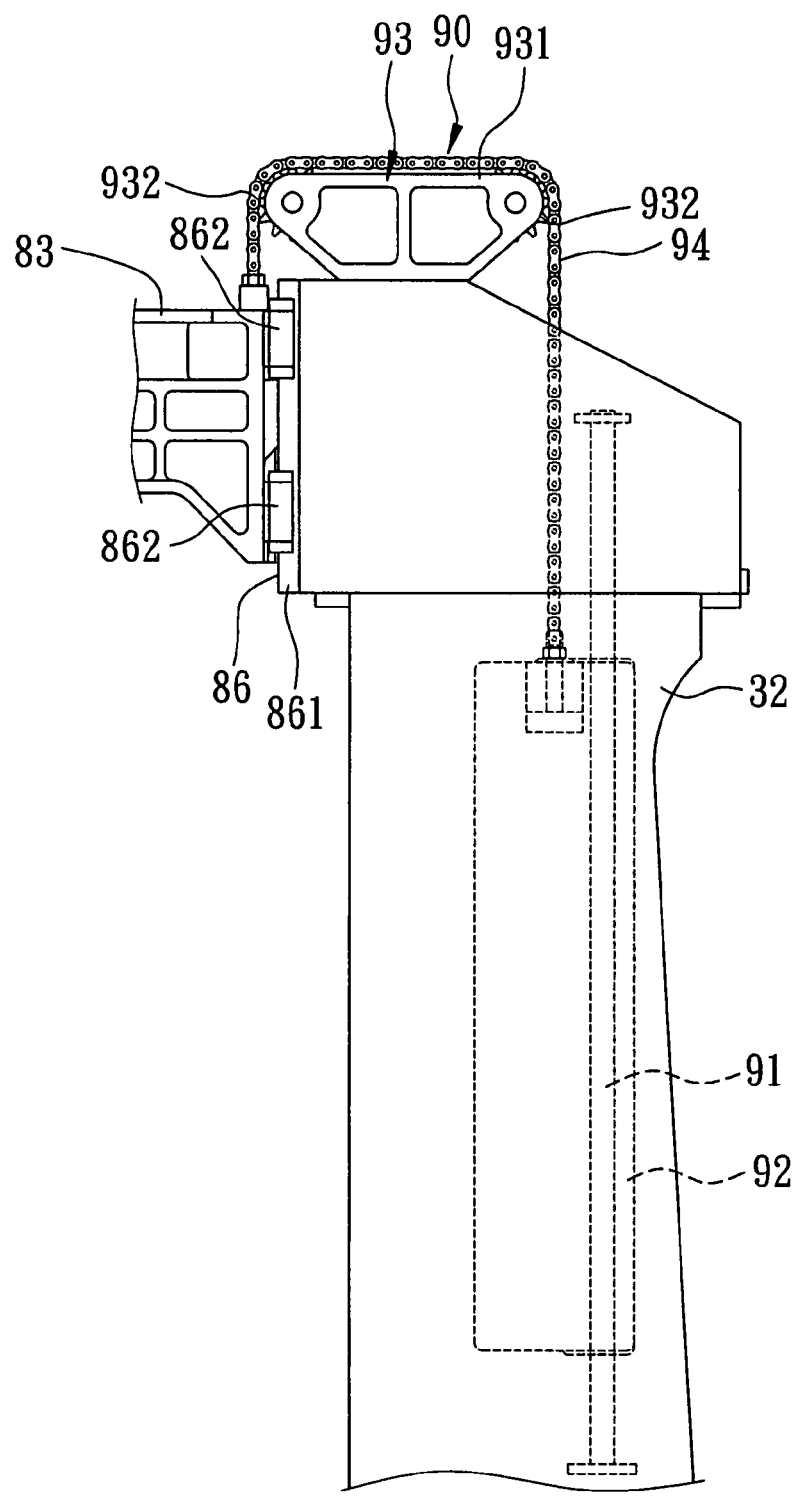
FIG. 4 is a fragmentary sectional view of the preferred embodiment, illustrating a balancing unit.

With particular reference to FIGS. 3 and 4, the worktable unit 70 includes a horizontal threaded rod 71 journalled on the front and rear walls 45, 46 of the worktable-carrying member 40 and extending along a first horizontal direction (Y), a second motor 72 disposed on the worktable-carrying member 40 for rotating the horizontal threaded rod 71, a movable table 73 connected fixedly to a nut 711 engaging the horizontal threaded rod 71 and movable on the top wall 41, a worktable 74 movable on the movable table 73 along a second horizontal direction (X) perpendicular to the first horizontal direction (Y), and a driving assembly 75 disposed between the worktable 74 and the movable table 73 for moving the worktable 74 on the movable table 73 along the second horizontal direction (X).

The spindle device 8 includes a spindle unit and a balancing unit 90.

The spindle unit includes an upper vertical threaded rod 81 journalled on the upright mounting frame 32 and disposed above the guiding unit 51, an upper driving unit or third motor 82 disposed on the upright mounting frame 32 for rotating the upper vertical threaded rod 81, a spindle seat 83 attached fixedly to a nut 811 engaging the upper vertical threaded rod 81, a main spindle 84 journalled on the spindle seat 83, and a fourth motor 85 disposed on the spindle seat 83 for rotating the main spindle 84.

The spindle unit further includes a guiding unit 86 consisting of a vertical guiding rail 861 disposed fixedly on the upright mounting frame 32, and two sliding blocks 862 connected fixedly to the spindle seat 83 and disposed slidably on the guiding rail 861 so as to guide vertical movement of the spindle seat 83 on the upright mounting frame 32. As such, rotation of the upper vertical threaded rod 81 results in vertical movement of the spindle seat 83.

The balancing unit 90 includes an upright guiding rod 91 disposed fixedly on the upright mounting frame 32, a counterweight block 92 sleeved movably on the guiding rod 91 and movable along a vertical direction (Z), a guiding wheel assembly 93 disposed on a top end portion of the upright mounting frame 32, and two driving belts 94 each extending around the guiding wheel assembly 93 and having two ends fastened respectively to the spindle seat 83 and the counterweight block 92.

The guiding wheel assembly 93 includes a mounting frame 931, and two pairs of guiding wheels 932 disposed rotatably on the mounting frame 931.

The guiding wheels 932 are configured as sprockets. Each of the driving belts 94 is configured as a chain engaging a corresponding pair of the sprockets 932.

Due to the presence of the balancing unit 90, the spindle seat 83 can be moved smoothly.

A cutter 100 is mounted removably to the spindle 84. A workpiece 101 is placed on the worktable 74.

When it is desired to machine the workpiece 101, the second motor 72 is operated to thereby rotate the horizontal threaded rod 71. Hence, the nut 711 together with an assembly of the movable table 73, the driving assembly 75, the worktable 74, and the workpiece 101 move on the horizontal threaded rod 71 along the first horizontal direction (Y). The driving assembly 75 is operated to thereby move the worktable 74 and the workpiece 101 along the second horizontal direction (X). The swing lever 63 is operated to thereby rotate the first driving rod 61, the first driving gear 62, the driven gear 55, and the lower vertical threaded rod 54. Rotation of the lower vertical threaded rod 54 results in movement of an assembly of the lower vertical threaded rod 54, the supporting block 47, and the worktable-carrying member 40 along the vertical direction (Z). The control switch 67 may be operated (i.e., switched on) instead of the swing lever 63 to thereby rotate the second driving rod 64, the second driving gear 65, and the lower vertical threaded rod 54. This also results in an adjustment to the position of the workpiece 101 along the vertical direction (Z). Subsequent to the position-adjusting of the workpiece 101, the third motor 82 is operated to thereby rotate the upper vertical threaded rod 81. Hence, an assembly of the nut 811 and the spindle seat 83 is moved on the upper vertical threaded rod 81 along the vertical direction (Z). As a result, the cutter 100 can be adjusted to a desired position relative to the workpiece 101, thereby allowing for performing of a machining operation on the workpiece 101.

In view of the above, the machine tool of this invention has the following advantages:

(1) Vertical positions of the main seat 83 and the worktable-carrying member 40 can be adjusted. As such, the vertical distance therebetween can be increased. Thus, the machine tool of this invention can perform a machining operation on a large-sized workpiece 101.

(2) The main spindle 83 can move smoothly along the vertical direction (Z) with the assistance of the balancing unit 90.

(3) Due to the presence of the damping units 56, an excessively quick movement of the worktable-carrying member 40 can be prevented.

With this invention thus explained, it is apparent that numerous modifications and variations can be made without departing from the scope and spirit of this invention. It is therefore intended that this invention be limited only as indicated by the appended claims.

I claim:

1. A machine tool comprising:
   a machine frame including a base seat, and a hollow upright mounting frame disposed fixedly on said base seat;
   a worktable device including
      a worktable-carrying member movable vertically on said machine frame and including a housing, and a supporting block connected fixedly to said housing,
      a lower driving unit including a guiding unit for guiding vertical movement of said worktable-carrying member on said machine frame, a threaded seat disposed fixedly on said base seat and formed with a threaded hole, a lower vertical threaded rod engaging said threaded hole in said threaded seat, and a driven gear connected fixedly to said lower vertical threaded rod, said supporting block being sleeved rotatably on and movable synchronously with said lower vertical threaded rod,
      an operating unit including a first driving rod journalled on and extending into said housing of said worktable-carrying member, a first driving gear connected fixedly to said first driving rod and meshing with said driven gear, and a swing lever connected to said first driving rod and operable to rotate said first driving rod, and
      a worktable attached to said housing of said worktable-carrying member;
   a spindle unit including an upper vertical threaded rod journalled on said upright mounting frame of said machine frame, an upper driving unit operable to rotate said upper vertical threaded rod, a spindle seat connected to said upper vertical threaded rod such that rotation of said upper vertical threaded rod results in vertical movement of said spindle seat, a main spindle journalled on said spindle seat, and a motor for rotating said main spindle; and
   a balancing unit including an upright guiding rod disposed fixedly in said upright mounting frame of said machine frame, a counterweight block sleeved movably on said guiding rod, a guiding wheel assembly disposed on a top end portion of said upright mounting frame, and a driving belt extending around said guiding wheel assembly and having two ends fastened respectively to said spindle seat and said counterweight block.

2. The machine tool as claimed in claim 1, wherein said guiding wheel assembly of said balancing unit includes at least one guiding wheel configured as a sprocket, said driving belt being configured as a chain engaging said sprocket.

3. The machine tool as claimed in claim 1, wherein said lower driving unit further includes two damping units flanking said lower vertical threaded rod and interconnecting said supporting block and said base seat for damping movement of said supporting block on said lower vertical threaded rod.

4. The machine tool as claimed in claim 3, wherein each of said damping units is configured as a pressure cylinder, and includes a cylinder body connected fixedly to said base seat, and a piston rod disposed movably on said cylinder body and connected fixedly to said supporting block.

5. The machine tool as claimed in claim 1, wherein said spindle unit further includes a vertical guiding rail disposed fixedly on said upright mounting frame, and at least one sliding block connected fixedly to said spindle seat and disposed slidably on said guiding rail so as to guide vertical movement of said spindle seat on said upright mounting frame.

6. The machine tool as claimed in claim 1, wherein said operating unit further includes:
   a second driving rod journalled on and extending into said housing of said worktable-carrying member;
   a second driving gear disposed fixedly on said second driving rod and meshing with said driven gear;
   a motor for rotating said second driving rod; and
   a control switch disposed on said housing and operable to control said motor.

7. The machine tool as claimed in claim 6, wherein said driven gear, and said first and second driving gears are configured as bevel gears.

8. The machine tool as claimed in claim 1, wherein said lower vertical threaded rod has a large-diameter threaded lower section engaging said threaded hole in said threaded seat and having an upper end abutting against a lower end of said supporting block at an upper end thereof, a mediate-diameter intermediate section extending upwardly from said upper end of said large-diameter threaded lower section and through said supporting block, and a small-diameter upper end section extending from said mediate-diameter intermediate section and having a diameter smaller than that of said mediate-diameter intermediate section, said driven gear being sleeved fixedly on said small-diameter upper end section and abutting against an upper end of said mediate-diameter intermediate section.

9. The machine tool as claimed in claim 1, wherein said spindle unit further includes a nut engaging said upper vertical threaded rod, said spindle seat being attached fixedly to said nut.

* * * * *